(12) United States Patent
Choi

(10) Patent No.: US 9,328,786 B2
(45) Date of Patent: May 3, 2016

(54) PARKING BRAKE DEVICE

(71) Applicant: HYUNDAI MOBIS CO., LTD., Seoul (KR)

(72) Inventor: Moo Jin Choi, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 14/321,570

(22) Filed: Jul. 1, 2014

(65) Prior Publication Data

US 2015/0159711 A1 Jun. 11, 2015

(30) Foreign Application Priority Data

Dec. 10, 2013 (KR) .................. 10-2013-0153475

(51) Int. Cl.
*F16D 65/28* (2006.01)
*F16D 65/14* (2006.01)
*B60T 13/74* (2006.01)
*F16D 121/24* (2012.01)
*F16D 125/60* (2012.01)
*F16D 125/62* (2012.01)

(52) U.S. Cl.
CPC ............... *F16D 65/14* (2013.01); *B60T 13/746* (2013.01); *F16D 2121/24* (2013.01); *F16D 2125/60* (2013.01); *F16D 2125/62* (2013.01)

(58) Field of Classification Search
CPC .. F16D 65/28; F16D 2121/24; F16D 2125/40; F16D 2125/60
See application file for complete search history.

(56) References Cited

U.S. PATENT DOCUMENTS

| 5,493,934 | A  | * | 2/1996  | Kelley ........................... 74/502.6 |
| 5,570,611 | A  | * | 11/1996 | Pospisil et al. ................ 74/502.6 |
| 5,590,744 | A  | * | 1/1997  | Belmond ........................ 188/265 |
| 5,983,745 | A  | * | 11/1999 | Petrak ........................... 74/502.4 |
| 7,383,927 | B2 | * | 6/2008  | Terradas et al. ................ 188/162 |
| 7,490,699 | B2 | * | 2/2009  | Gil et al. ........................ 188/2 D |
| 8,051,956 | B2 | * | 11/2011 | Huang et al. ................... 188/2 D |
| 2004/0083607 | A1 | * | 5/2004 | Campbell ........................ 29/857 |

FOREIGN PATENT DOCUMENTS

KR 10-2009-0039056 A 4/2009

* cited by examiner

*Primary Examiner* — Bradley King
(74) *Attorney, Agent, or Firm* — Knobbe Martens Olson & Bear LLP

(57) ABSTRACT

A parking brake device according to the present invention comprises a housing unit; a bolt screw configured to be included in the housing unit, and rotate due to an actuation of a driving unit; and a nut screw configured to engage with the blot screw which is passed through the nut screw.

8 Claims, 7 Drawing Sheets

PARKING BRAKE DEVICE

CROSS-REFERENCES TO RELATED APPLICATIONS

The present application claims priority to Korean application number 10-2013-0153475, filed on Dec. 10, 2013 in the Korean Intellectual Property Office, which is incorporated by reference in its entirety.

BACKGROUND OF THE INVENTION

The present invention relates to a parking brake device, and in particular, to a parking brake device actuating by converting a rotating force to a linear movement, and being able to extend the length of stroke.

A parking brake device is generally used in order to prevent a parked vehicle from moving. In case of an Electronic Parking Brake device (EPB), it converts a rotating movement of a motor unit to a linear movement to thereby transmit braking force to the wheels of vehicle.

That is, when the electronic parking brake device drives the motor unit by actuating a switch or a lever, a bolt screw and a nut screw are moved according to rotating of the motor unit, and pull a brake cable connected to the bolt screw and the nut screw to generate a braking force.

In general, the parking brake device limits a stroke by a layout with the peripheral components, a shape of the nut screw and a coupling position of the brake cable, wherein the stroke is a relative moving distance between the nut screw and the bolt screw. Thus, the parking brake device has the problem that does not obtain the stroke sufficiently. Therefore, there is a need to improve the problem.

Meanwhile, Background Art of the present invention is disclosed in Korean Patent Laid-Open Publication No. 2009-0039056 (published on Apr. 22, 2009, Title of The Invention: Electronic Parking Brake system for Vehicle).

SUMMARY OF THE INVENTION

The present invention has been devised in order to improve the problem, and provides a parking brake device which can extend a length of stroke that is a relative moving distance between a nut screw and a bolt screw and reduce rattling generated in moving the nut screw.

The parking brake device according to the present invention is characterized by comprising a housing unit; a bolt screw configured to be included in the housing unit, and rotate due to an actuation of a driving unit; and a nut screw configured to engage with the blot screw which is passed through the nut screw.

The bolt screw in the present invention is characterized by comprising a driving unit-connecting unit configured to connect an outer peripheral surface thereof to the driving unit to thereby be rotated by the driving unit; a bolt cable coupling unit configured to be protrudingly formed at one end of the driving unit-connecting unit to connect the bolt cable coupling unit to a brake cable; and a threaded portion configured to be protrudingly formed at the other end of the driving unit-connecting unit, wherein threads are formed in an outer peripheral surface of the threaded portion, thereby to engage the threaded portion with the nut screw.

The nut screw in the present invention is characterized by comprising a nut screw body configured to enclose an outside of the bolt screw, and engage with the bolt screw which is passed through inside the nut screw body; and a nut cable coupling unit configured to couple to the nut screw body, wherein the brake cable is couple to the nut cable coupling unit.

The nut cable coupling unit in the present invention is characterized by comprising a cable coupling body configured to be mounted on an outer peripheral surface of the nut screw body; and a cable coupling recessed portion configured to be formed in the cable coupling body, wherein the brake cable is coupled to the cable coupling recessed portion.

The cable coupling body in the present invention is characterized by being formed integrally with the nut screw body.

The cable coupling recessed portion in the present invention is characterized by being concavely formed in direction parallel to a longitudinal direction of the bolt screw.

The parking brake device according to the present invention is characterized by further comprising a guide unit configured to be fixed to the housing unit, and be slidably coupled with the nut screw to guide a movement of the nut screw.

The guide unit in the present invention is characterized by comprising a guide body configured to be located inside the housing unit; and a nut screw seating unit configured to be concavely formed inside the guide body to slidably couple the nut screw seating unit with the nut screw.

The guide body in the present invention is characterized by being formed integrally with the housing unit.

The guide unit in the present invention is characterized by further comprising a guide opening which is formed in one side of the guide body and receives the nut cable coupling unit therein to guide the movement of the nut cable coupling unit.

The guide opening in the present invention is characterized by being formed in a direction parallel to the longitudinal direction of the bolt screw.

The parking brake device according to the present invention can extend a length of stroke by changing the configuration of a nut screw and the coupling position of a brake cable.

Further, according to the present invention, the configuration of the nut screw is simple, and volume and weight thereof is reduced, thereby being able to reduce the manufacturing cost thereof.

Moreover, the present invention can prevent rattling of the nut screw to prevent wear and breakdown of the nut screw and the like, and further can reduce noise.

DESCRIPTION OF SPECIFIC EMBODIMENTS

Embodiments of the parking brake device of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
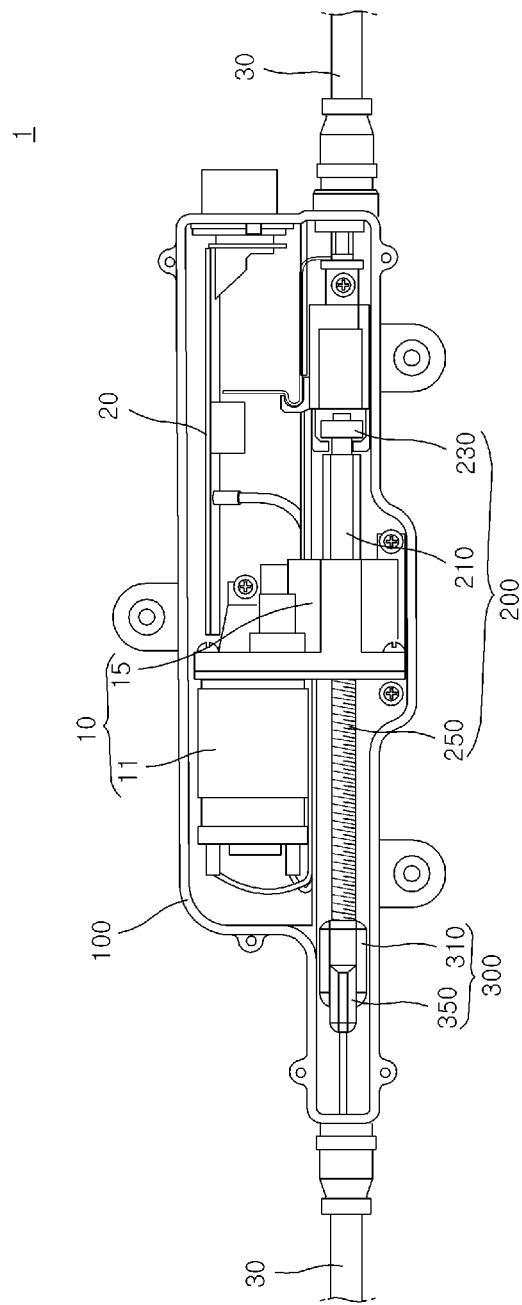
FIG. 1 is a cutaway view of a parking brake device according to an embodiment of the present invention.
Figure 2:
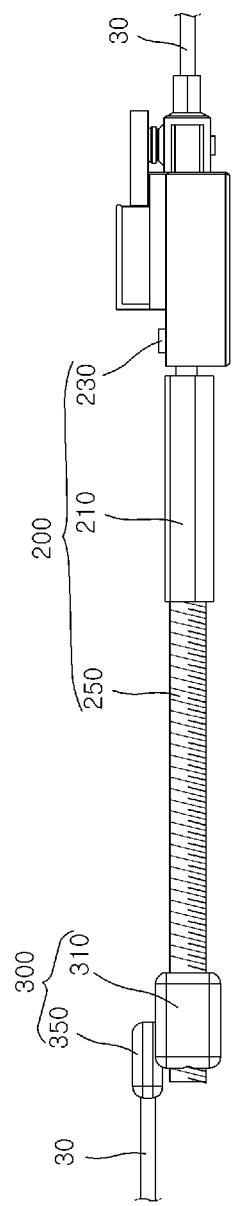
FIG. 2 is a view showing a state where a bolt screw and a nut screw are coupled in accordance with the embodiment of the present invention.

FIG. 1 is a cutaway view of a parking brake device according to an embodiment of the present invention, and FIG. 2 is a view showing a state where a bolt screw and a nut screw are coupled in accordance with an embodiment of the present invention. Referring to FIGS. 1 and 2, the parking brake device according to the embodiment of the present invention comprises a housing unit 100, a bolt screw 200 and a nut screw 300.

The housing unit 100 forms the appearance of the parking brake device 1, and is made of synthetic resin and metal material. In accordance with the embodiment of the present invention, the housing unit 100 is configured to enclose a driving unit 10, the bolt screw 200 and the nut screw 300, thereby preventing the parts such as the driving unit 10, the bolt screw 200 and etc. from being damaged by shock from outside, or them from being contaminated by foreign impurities entered from outside.

In accordance with the embodiment of the present invention, the driving unit 10 is controlled by an ECU (Electronic Control Unit) 20, and comprises a motor unit 11 and a decelerating unit 15. The motor unit 11 convert electric energy applied from outside to rotating energy. The decelerating unit 15 controls the rotating speed of the rotating energy converted by the motor unit 11. Thus, the rotating energy with the controlled rotating speed is transmitted to the bolt screw 200 to rotate the bolt screw 200.

The bolt screw 200 is located in a housing unit 100 to rotate by an actuation of the driving unit 10. In accordance with the embodiment of the present invention, the bolt screw 200 comprises a driving unit-connecting unit 210, a bolt cable coupling unit 230 and a threaded portion 250.

The driving unit-connecting unit 210 couples an outer peripheral surface thereof with the driving unit 10, thereby rotating by the driving unit 10. In accordance with the embodiment of the present invention, the driving unit-connecting unit 210 is formed in a prismatic shape, and is slidably coupled to the driving unit 10.

Thus, the driving unit-connecting unit 210 can rotate by the rotation force transmitted from the driving unit 10, and at the same time, the driving unit-connecting unit 210 can reciprocally move (the right-left direction based on FIG. 1) while engaging with the nut screw 300 or releasing from the engagement therewith.

The bolt cable coupling unit 230 is protrudingly formed at one end (the right end based on FIG. 1) of the driving unit-connecting unit 210, and is connected to one brake cable 30 of a pair of brake cables 30 directly or through a bracket, and etc.

The threaded portion 250 is protrudingly formed at the other end (the left end based on FIG. 1) of the driving unit-connecting unit 210, and threads are formed in an outer peripheral surface of the threaded portion 250, thereby to engage the threaded portion 250 with the nut screw 300.

Figure 3:
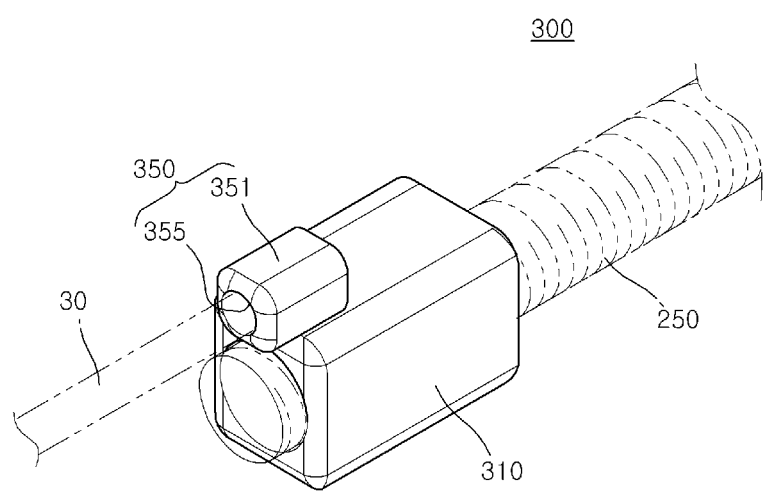
FIG. 3 is a perspective view of the nut screw according to the embodiment of the present invention.
Figure 4:
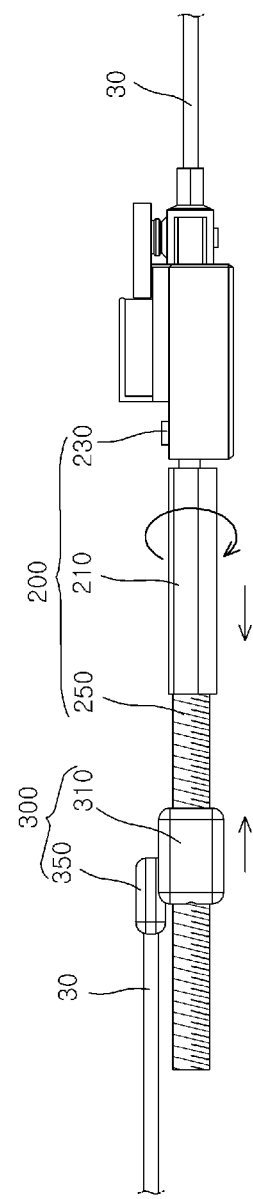
FIG. 4 is a view showing the actuation of the parking brake device according to the embodiment of the present invention.

FIG. 3 is a perspective view of the nut screw according to an embodiment of the present invention, and FIG. 4 is a view showing the actuation of the parking brake device according to an embodiment of the present invention.

Referring to FIGS. 3 and 4, the nut screw 300 is engaged with the bolt screw 200 which is passed through the nut screw 300. In accordance with the embodiment of the present invention, the nut screw 300 is coupled to the housing unit 100 or a guide unit 400 to be described hereinafter so as to be able to reciprocally move in the longitudinal direction of the bolt screw 200 with rotation thereof being limited to the housing unit 100 or the guide unit 400.

In accordance with the embodiment of the present invention, when the bolt screw 200 rotates by the driving unit 10, the nut screw 300 is moved inside the housing unit 100 while engaging with the bolt screw 200 or releasing from the engagement therewith. Thus, the brake cable 30 coupled to one end of the nut screw 300 is pulled or relaxed.

In accordance with the embodiment of the present invention, the nut screw 300 comprises a nut screw body 310 and a nut cable coupling unit 350.

The nut screw body 310 encloses outside the bolt screw 200, and is engaged with the bolt screw 200 which is passed through inside the nut screw body 310. In accordance with the embodiment of the present invention, since the nut screw body 310 is engaged with the bolt screw 200 which is passed through the nut screw body 310, the nut screw body 310 may reciprocally move on the bolt screw 200, and thus a length of stroke that is a moving distance according to the engagement with or the release from the bolt screw 200 become longer.

The nut cable coupling unit 350 is formed on an outer peripheral surface of the nut screw body 310, and the brake cable 30 is coupled to the nut cable coupling unit 350. In accordance with the embodiment of the present invention, the nut cable coupling unit 350 comprises a cable coupling body 351 and a cable coupling recessed portion 355.

The cable coupling body 351 is coupled to an outer peripheral surface of the nut screw body 310. In accordance with the embodiment of the present invention, the cable coupling body 351 is formed integrally with the nut screw body 310, and thus the brake cable 30 is couple to the cable coupling body 351.

The cable coupling recessed portion 355 is concavely formed in the cable coupling body 351, and thus the brake cable 30 is coupled in the cable coupling recessed portion 355. The configuration or shape of the cable coupling recessed portion 355 may vary depending on the specification of the brake cable 30 to be coupled. In accordance with the embodiment of the present invention, the cable coupling recessed portion 355 is concavely formed in the direction parallel to the longitudinal direction of the bolt screw 200.

Here, the direction parallel to the longitudinal direction of the bolt screw 200 eventually means the right-left direction based on FIG. 4. In accordance with the embodiment of the present invention, the cable coupling recessed portion 355 is concavely formed in a direction so as to make the brake cable 30 coupled to the cable coupling recessed portion 355 parallel to the longitudinal direction of the bolt screw 200, thereby prevent interference with the brake cable 30 and the bolt screw 200.

Figure 5:
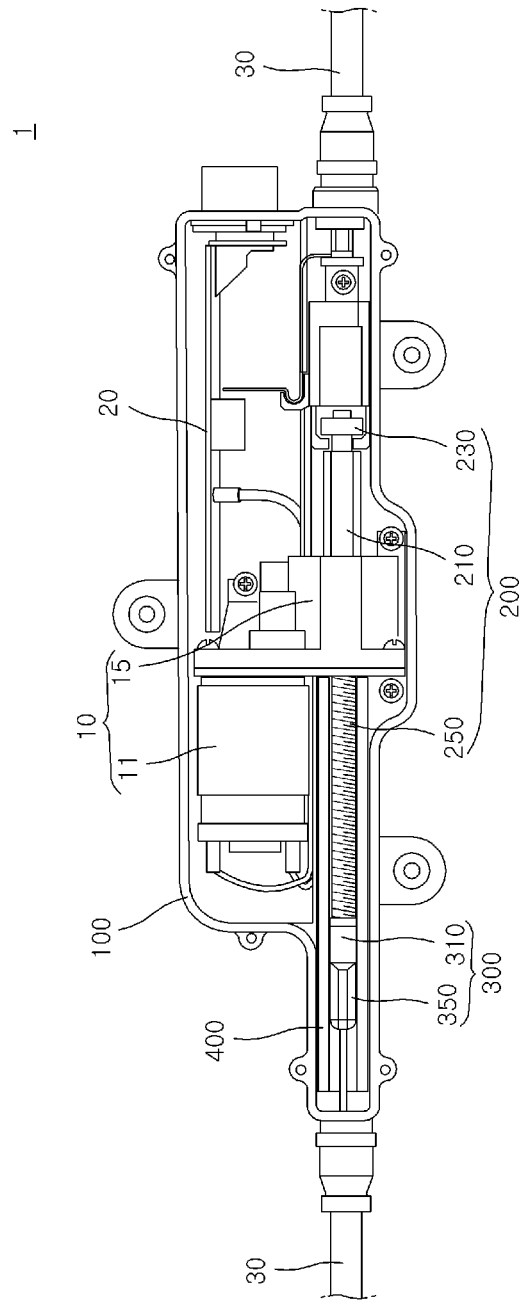
FIG. 5 is a cutaway view showing a state where a guide unit is mounted in accordance with an embodiment of the present invention.
Figure 6:
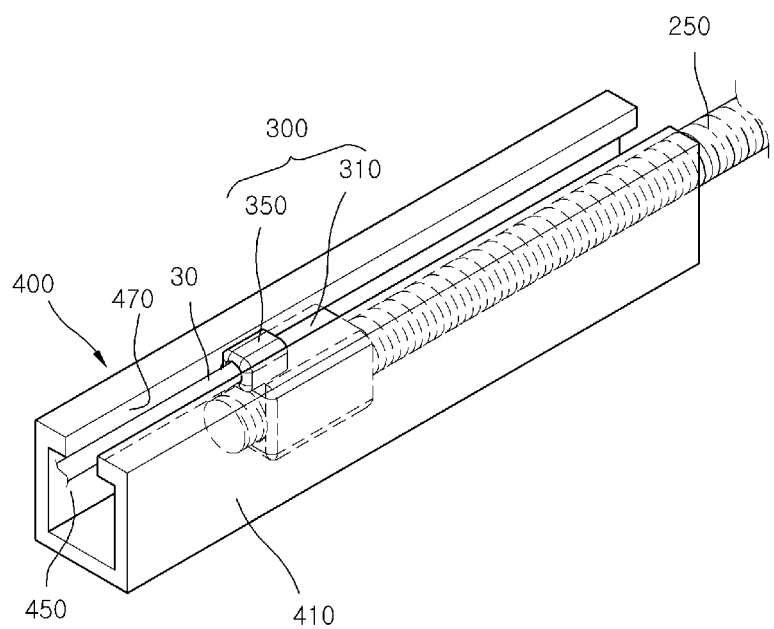
FIG. 6 is a view showing the guide unit and the nut screw according to an embodiment of the present invention.
Figure 7:
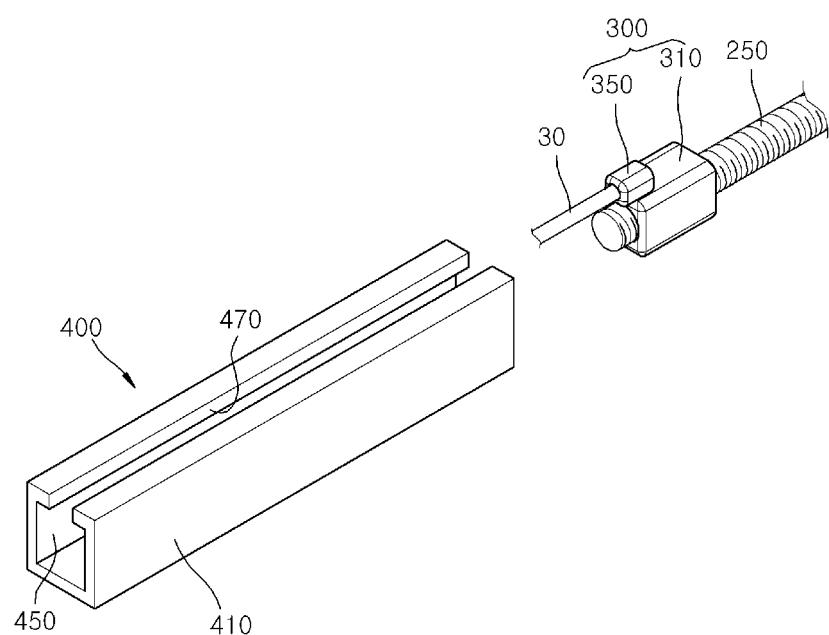
FIG. 7 is a view showing a state where the nut screw is coupled to the guide unit in accordance with the embodiment of the present invention.

FIG. 5 is a cutaway view showing a state where a guide unit is mounted in accordance with an embodiment of the present invention, FIG. 6 is a view showing the guide unit and the nut screw according to the embodiment of the present invention, and FIG. 7 is a view showing a state where the nut screw is coupled to the guide unit in accordance with the embodiment of the present invention.

Referring to FIGS. 5 to 7, the parking brake device 1 in the embodiment of the present invention further comprises a guide unit 400. The guide unit 400 is fixed to the housing unit 100, and is slidably engaged with the nut screw 300 to guide the movement of the nut screw 300. In accordance with the embodiment of the present invention, the guide unit 400 comprises a guide body 410 and a nut screw seating unit 450.

The guide body 410 is fixed inside the housing unit 100. In accordance with the embodiment of the present invention, the guide body 410 fixes an outer peripheral surface thereof to the housing unit 100, or is formed integrally with housing unit 100, thereby being formed lengthways in the length direction (the right-left direction based on FIG. 5) of the bolt screw 200.

The nut screw seating unit 450 is concavely formed inside the guide body 410 to slidably couple with the nut screw 300. In accordance with the embodiment of the present invention, the nut screw seating unit 450 is concavely formed in the guide body 410 into a shape corresponding to the outer shape of the nut screw body 310 so that the nut screw body 310 can be slidably coupled to the nut screw seating unit 450. Further, one side of the nut screw seating unit 450 is opened by a guide opening unit 470 to prevent interference with the nut cable coupling unit 350.

In accordance with the embodiment of the present invention, the guide opening unit 470 is formed in a direction parallel to the longitudinal direction of the bolt screw 200, thereby receiving the nut cable coupling unit 350 to guide movement of the nut cable coupling unit 350.

Now, operating principle of the parking brake device 1 according to an embodiment of the present invention will be described as follows.

When a driver operates a button or lever to actuate the parking brake device 1, the ECU 20 operates the driving unit 10. If the parking brake device is not an electronic type, it may be connected to a mechanically operating device, e.g., a lever (not shown) without the ECU 20 and be operated.

The rotating force generated by the driving unit 10 increases through the decelerating unit 15. Due to the increased rotating force, the decelerating unit 15 makes the bolt screw 200 to rotate. When the bolt screw 200 is rotated, it is released from or engaged with the nut screw 300 while the bolt screw 200 and the nut screw 300 move to pull and relax the brake cable 30.

The bolt screw 200 rotates while engaging with the decelerating unit 15, but the driving unit-connecting unit 210 is not fixed in an axial direction, so that the bolt screw 200 moves to the axial direction. Also, since the rotation of the nut screw 300 is limited by the housing unit 100 or the guide unit 400, the nut screw 300 is moved in the axial direction to make the force applied to the brake cable 30 equal.

The nut screw 300 is engaged with the bolt screw 200 which is passed through inside the nut screw 300, so that the nut screw 300 linearly moves on the bolt screw 200.

In accordance with the embodiment of the present invention, the parking brake device 1 may change the configuration of the nut screw 300 to notably extend the length of stroke.

Also, the parking brake device 1 according to the embodiment of the present invention has simple configuration of the nut screw 300 to reduce volume and weight thereof, thereby being able to reduce the manufacturing cost.

Further, the parking brake device 1 according to the embodiment of the present invention may prevent the rattling of the nut screw 300, thereby preventing wear and breakdown of the nut screw 300 and the like and reducing noise.

The foregoing invention has been explained in relation to the embodiments shown in the drawings. Accordingly, it is to be understood that the embodiments of the invention herein described are merely illustrative of the application of the principles of the invention. Further, those skilled in the art will appreciate that various modifications, additions and substitutions are possible, without departing from the scope and spirit of the invention as disclosed in the accompanying claims.

What is claimed is:

1. A parking brake device, comprising:
    a housing;
    a bolt located in the housing and configured to rotate about an axis;
    a nut engaged with the bolt and configured to slide along the axis as the bolt rotates about the axis;
    a cable connector fixed to the nut;
    a brake cable comprising an end fixed to the cable connector and extending between inside and outside the housing in a direction parallel to the axis; and
    a single piece guide structure comprising:
        a nut guide comprising an elongated tube configured to guide the nut inside the elongated tube, and
        a connector guide comprising an elongated slit formed through a wall of the elongated tube such that the elongated slit is configured to guide the cable connector outside the elongated tube as the nut slides along the axis.

2. The parking brake device according to claim 1, further comprising a bolt screw module which comprises:
    a driving unit-connecting unit connected to a driving unit to thereby be rotated by the driving unit;
    a bolt cable coupling unit protrudingly formed at one end of the driving unit-connecting unit and connected to another brake cable; and
    the bolt protrudingly formed at the other end of the driving unit-connecting unit, wherein threads are formed in an outer peripheral surface of the bolt, thereby to engage the bolt with the nut.

3. The parking brake device according to claim 1, wherein the cable connector comprises:
    a cable coupling body configured to be mounted on an outer peripheral surface of the nut; and
    a cable coupling recessed portion formed in the cable coupling body, wherein an end of the brake cable is received in the cable coupling recessed portion.

4. The parking brake device according to claim 3, wherein the cable coupling body is formed integrally with the nut.

5. The parking brake device according to claim 3, wherein the cable coupling recessed portion is concavely formed in a direction parallel to a longitudinal direction of the bolt.

6. The parking brake device according to claim 1, wherein the single piece guide structure is fixed to the housing.

7. The parking brake device according to claim 1, wherein the elongated slit is defined by two parallel rails, wherein the cable connector is disposed between the two parallel rails.

8. The parking brake device according to claim 1, wherein the direction of the brake cable's extension is offset from the axis.

* * * * *